March 2, 1954  W. F. GARTRELL  2,670,490
ROTARY SCRAPING BRUSH
Filed Sept. 26, 1950  2 Sheets-Sheet 1
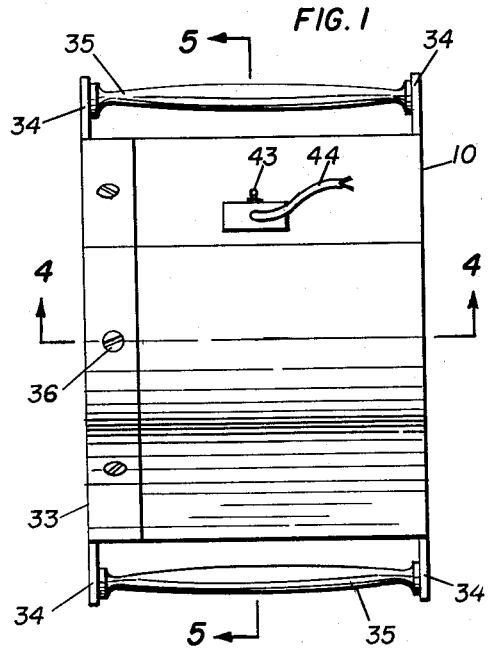
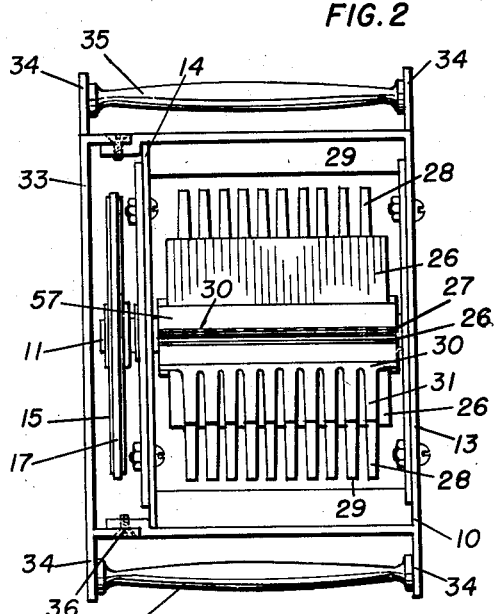
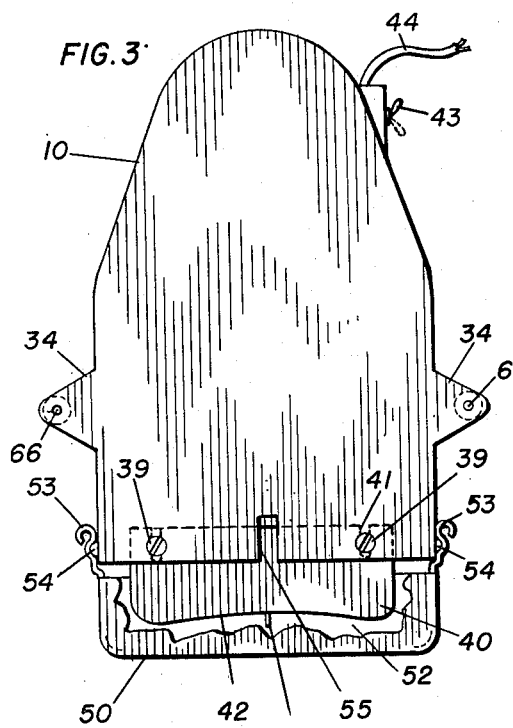
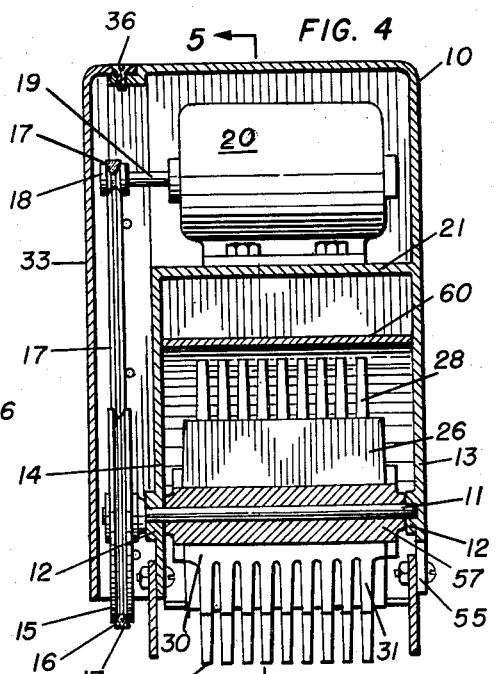
INVENTOR.
WILLIAM FRANKLIN GARTRELL
BY Howard J. Whelan
ATTORNEY March 2, 1954 W. F. GARTRELL 2,670,490
ROTARY SCRAPING BRUSH
Filed Sept. 26, 1950 2 Sheets-Sheet 2
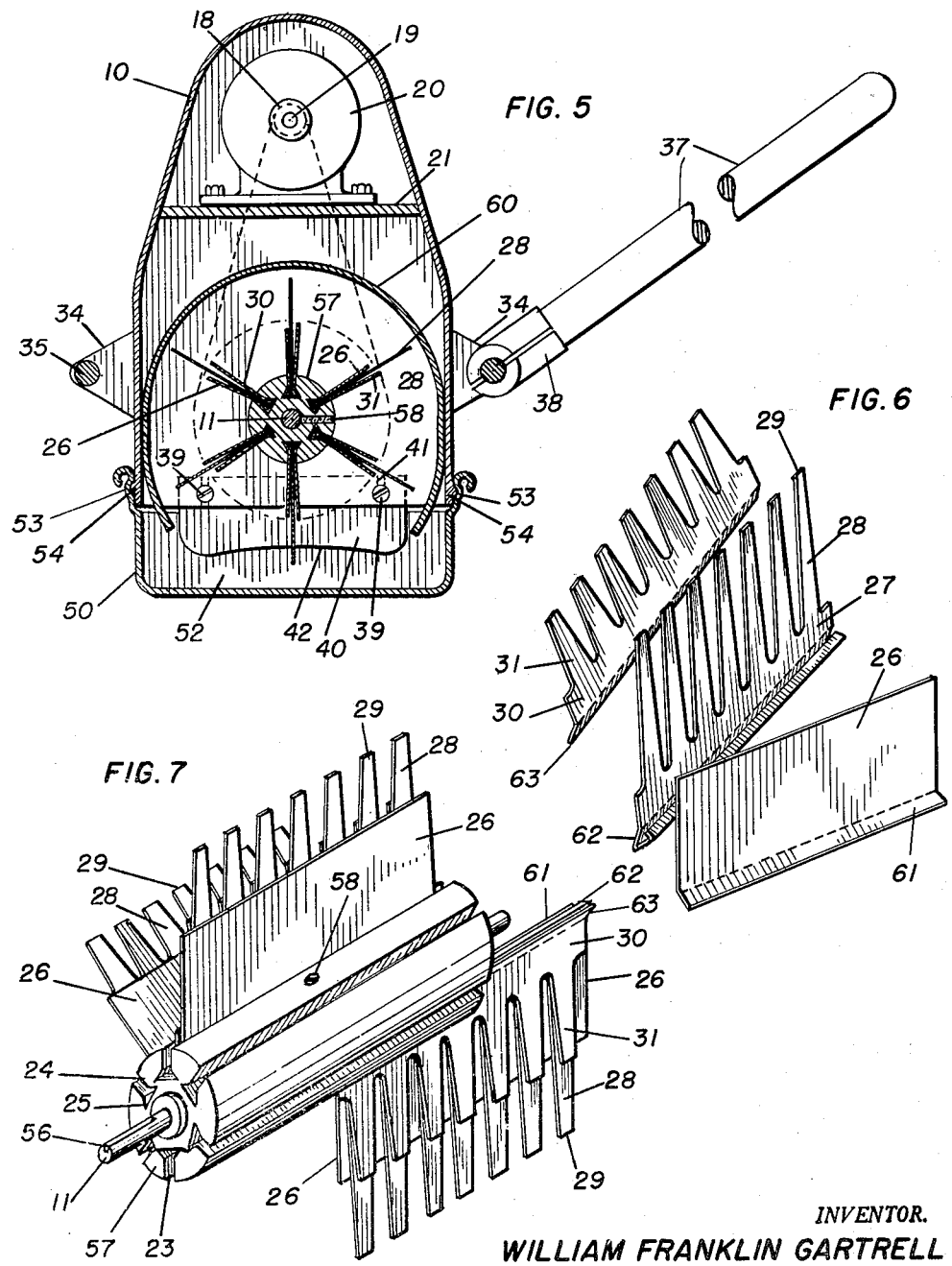
INVENTOR.
WILLIAM FRANKLIN GARTRELL
BY Howard J. Whelan
ATTORNEY Patented Mar. 2, 1954

2,670,490

UNITED STATES PATENT OFFICE 2,670,490

ROTARY SCRAPING BRUSH

William Franklin Gartrell, Baltimore, Md.

Application September 26, 1950, Serial No. 186,837

2 Claims. (Cl. 15—200)

This invention relates to scraping equipment and more particularly to those adaptable for the scraping of surfaces by machines intended to remove all deleterious material and leave a clean and relatively smooth surface.

Machines for scraping meat blocks, bars, walls and floors to remove a thin top surface or layer therefrom, are conventionally operating with a brush rotating circularly on the surface in question. This produces a series of circles and circular markings on the surfaces and prevents a uniform scraping from being done on the surface, particularly in the corners. Further the scraping brushes are not easily removable and for sanitary purposes where meat blocks and other food surfaces are involved, this is a serious defect. In this invention the scraping brushes are made to travel uniformly with a rectilinear movement. These brushes are easily inspected and replaced conveniently at any time without dismantling the machine.

It is an object of the invention to provide a new and improved scraping brush that will avoid one or more of the disadvantages and limitations of the prior art.

Another object of the invention is to provide a new and improved scraping brush that can work with a rectilinear movement, and do the work of scraping of a surface in an effective manner.

A still further object of the invention is to provide a new and improved scraping brush that will be portable, usable for tables, walls and floors, economical in operation as well as effective in use, and convenient to handle.

Other objects will become apparent as the invention is outlined in more detail.

For a better idea of the invention, and its general construction, reference is made to a preferred form thereof illustrated in the drawings attached hereto. These drawings in conjunction with the following description present this form as an example, not as a limitation, while the claims indicate the scope of the invention.

Referring to the drawings:

Figure 1 is a plan view of a scraping machine embodying this invention;

Figure 2 is a bottom view of Figure 1;

Figure 3 is a side elevation of the machine;

Figure 4 is a sectional elevation taken on line 4—4 of Figure 1;

Figure 5 is a sectional elevation taken on line 5—5 of Figure 1;

Figure 6 is a perspective exploded view of one scraper unit, and

Figure 7 is an exploded view in perspective of the main shaft and support of the machine with the scraper members partly in place and partly detached.

Similar reference characters refer to similar parts throughout the drawings.

In the particular form shown in Figure 1, the structure illustrated is that of a scraping machine particularly suitable for the scraping or cleaning of meat blocks. It consists of a suitably contoured housing 10 for the general mechanism of the machine. This mechanism includes a central shaft 11 passing transversely across the housing 10 and supported at the ends in bearings 12 installed on the straight side walls 13 and 14 of the housing. The end of the shaft in the bearing of the side wall 14 is extended sufficiently to permit a pulley 15 to be keyed at 56 and secured thereon. The pulley rides at the side of the housing and has its rim 16 formed to take a V-belt 17 therein in a conventional manner. The V-belt 17 acts as a transmission from the pulley 18 on the shaft 19 of an electrical motor 20. The motor 20 is mounted on bracket 21 forming a part of the housing and arranged parallel to the shaft 19 but spaced and separated therefrom to keep it clear of the brush. The bracket 21 is arranged above a semi-enclosure 60 so it will prevent the brush from scattering the materials scraped from the block being cleaned.

The hub 57 is slotted longitudinally in its periphery. These slots 23 are preferably six in number and of the sectional contour shown in Figure 7. The sides 24 of the slots are relatively straight from the peripheral surface inwardly for about half their depth. The balance of the depth is made with sides 25 that have a dovetail contour. These slots 23 serve to hold the edge portions of the scraper members or brush as a unit. The brush includes a flat guard plate 26 having a flared end 61, termed arbitrarily the backing plate. Each plate 26 extends out radially from its slot in hub 57 as indicated in the drawings, and is of predetermined width. Next in contact with this plate 26 is the brush member or knife 27 that is set parallel with the backing plate 26. The knives 27 are positioned in each slot and are flat and thin and are provided with a springy end portion 62. The knives 27 extend parallel to the plates 26 and project beyond them sufficiently to give a resilient action, when pressed against the plates. This brushing action does the scraping especially when the metal or material of which the knives or brushes 27 are made is suitable for this kind of work. The knife blades 28 themselves are cut from their respective main knife plate or brush 27 into a form like that of a comb with the teeth flat and cut off straight at the periphery to provide the cutting edges 29. The knife blades 28 are slightly tapered as shown and are spaced apart a distance equal to that of a knife blade approximately. Bearing against the knife or brushes 27 opposite to that of the backing plate 26, is a resilient pressure plate 30 which is comb-formed like the knife plate 27 with its tongues 31 slightly tapered flat and thin. These tongues press against the knife blades 28 and reinforce them. The backing plates 26 and pressure plates 30 are about half the height of the blades 28 which they sandwich in between. The pressure plate 30 is provided with a projecting end 63. The blades 28 snap against the plates 26 as soon as they scrape by the surface resiliently and the tongues 31 of the pressure plates facilitate this function, as well as serve as an auxiliary resilient reinforcement for the blades 28.

The side wall 13 of the housing is arranged with a radial slot 55 extending at an angle across it from its corresponding bearing 12. This slot is made wide enough to allow each scraper set or brush unit to be slid laterally through it when it is aligned therewith for replacement of blades without taking the hub 57 out of the unit. This permits the removal or replacement of the scraper set or brush units to be done individually as required or desirable. The lower portions 61, 62 and 63 respectively of the sets 26, 27 and 30 are formed to fit in the slots 23 readily and lock frictionally therein in an adequate manner.

A protecting cover 33 is bolted to the housing 10 over the transmission so as to protect its moving parts. It is easily removable and looks attractive. The housing is also provided with lugs or brackets 34 on which handles 35 are held by the bolts 36. These handles are of a form to permit facile handling by the user with its hands, or a stick 37 may be used with them held thereon by a clamp 38 at any suitable angle. With this stick the machine can be used for scraping floors and in another way where the manual operation is not so convenient. A cage 50 is removably mounted on the housing 10 to cover the brush opening 52 and protect the blades from injury. It is sprung into place with its recessed lugs 53 closing on the ribs 54 on the exterior surface of the housing. The cage is attached only when the machine is not in use.

The machine has a number of conspicuous characteristics. It can be set on a flat surface like a meat block, and the adjustment for contact with it by the knife blades made by the use of lateral platens or runners 40 held by screws 39 in the housing 10. These platens 40 are slotted at 41 for the purpose to allow this and they are placed on both sides of the housing to adjust the latter's relation with the surface to be scraped. The contour of their lower edges 42 is made as indicated in the drawings and enables the position of the housing to be varied through a considerable degree of spacings and angles. The knife blades 28 are bent as they contact the surface they are intended to clean off and do not interfere with the adjustment made in the housing on the surface. The scraping operation of the knife blades on the surface is rectilinear and therefore will scrape it on column outline, and not in circles as in the conventional types of machines. This allows the machine to be used in the corners as well as across the surface. The individual sets of blade elements can be removed from the slot, removing a bearing if necessary to do this. The device is portable and can be handled by an individual conveniently and without danger to himself or the surrounding environment. The usual switches 43, cables 44 and other common features applicable to this type of machine are intended to be included in its construction whether shown or not.

While but one general form of the invention is shown in the drawings and described in the specification, it is not desired to limit this application for patent to this particular form, as it is appreciated that other forms of construction could be made that would use the same principles and come within the scope of the appended claims.

Having thus described the invention, what is claimed is:

1. A rotary brush comprising a hub having a series of spaced longitudinal slots on the periphery thereof, a set of tooth-comb knives having a common base arranged in each slot, a guard plate having a base fitting against each set of knives and pressing against one side of each set of knives, a set of tooth-comb pressure plates having a common base pressing against the opposite side of each set of knives, said guard plate and pressure plate extending outwardly a distance short of the terminal upward ends of the knives, and interlocking flexible means provided at the base of the associated knives, guard plate and pressure plate to maintain them in operative relation in the same slot.

2. A rotary brush comprising a hub having a series of spaced longitudinal slots on the periphery thereof, a plurality of sets of scraping elements, each set projecting radially and outwardly from each of the slots, each set of scraping elements comprising flat and thin aligned tooth-shaped knives merging into a common base having oppositely disposed spring end projections fitting in its associated slot, a guard constituting a plate fitting against each set of tooth-shaped knives and having a springy flared lower end fitting adjacent one of the spring projections of the knives in the same slot, said plate extending upwardly a distance short of the terminal upward ends of the knives, and a resilient pressure plate fitting against the side of each of said knives opposite to the guard plate, said pressure plate also having tooth-shaped elements extending upwardly a distance short of the terminal upward ends of the knives, said pressure plate also having a flared lower end fitting against the other spring end projections of the knives in the same slot, whereby said knives, guard and plate are springingly interlocked.

WILLIAM FRANKLIN GARTRELL.

References Cited in the file of this patent

UNITED STATES PATENTS

| Number | Name | Date |
|---|---|---|
| 1,558,544 | Holzapfel | Oct. 27, 1925 |
| 1,663,059 | Peterson | Mar. 20, 1928 |
| 1,721,266 | Anderson | July 16, 1929 |
| 1,796,700 | Ardron | Mar. 17, 1931 |
| 2,251,069 | Schaffer | July 29, 1941 |
| 2,480,739 | Johnson | Aug. 30, 1949 |